Patented Jan. 23, 1934

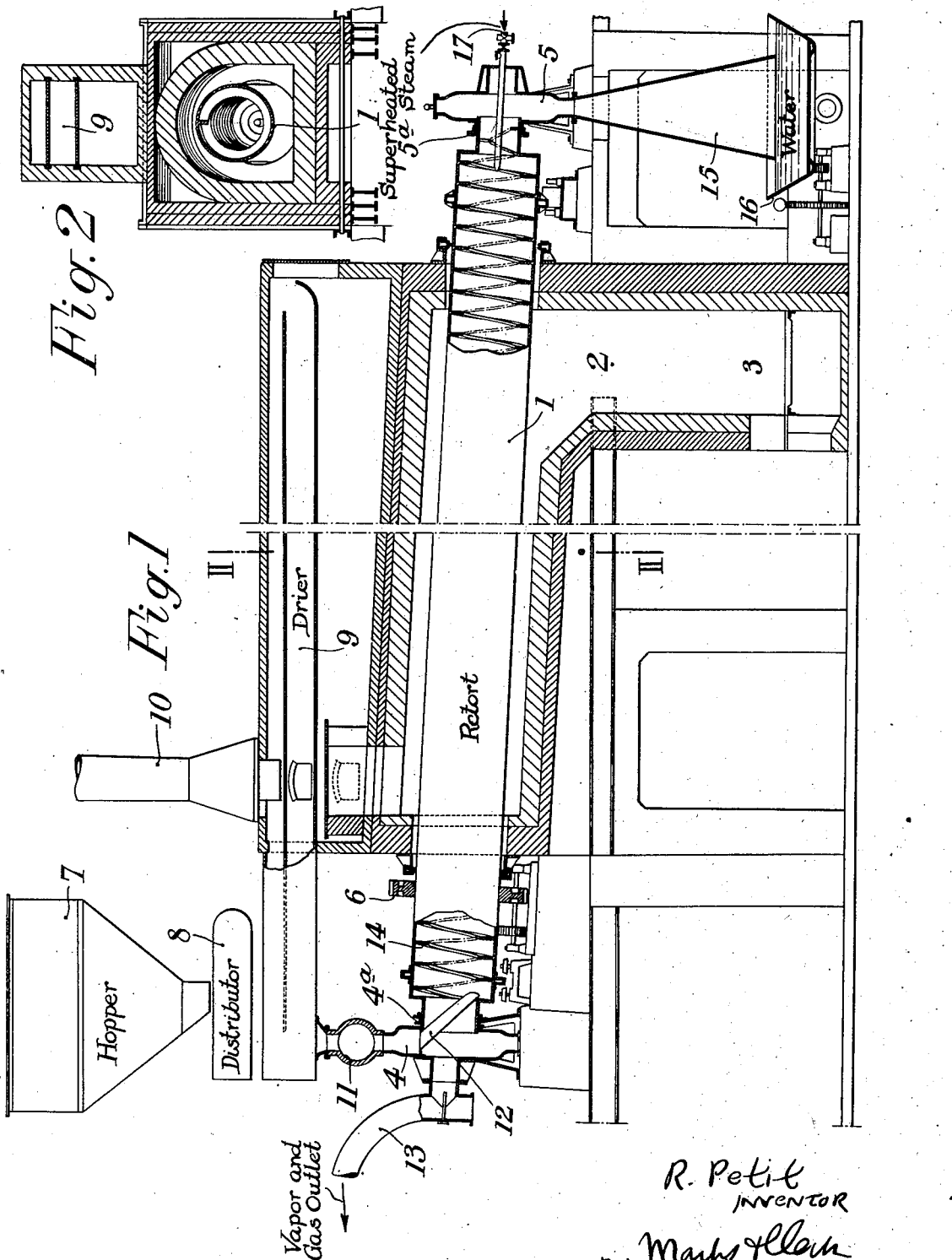

1,944,647

UNITED STATES PATENT OFFICE 1,944,647

APPARATUS FOR THE DISTILLATION OF BITUMINOUS SCHISTS

René Petit, Luxeuil Les Bains, France, assignor to Societe Des Schistes Et Petroles De Franche Comte, Luxeuil Les Bains, France Application July 17, 1931, Serial No. 551,189, and in France May 19, 1931

2 Claims. (Cl. 202—131)

This invention relates to the distillation of bituminous schists, and has for an object an apparatus for effecting the distillation of this material in a very reduced period of time, that is to say about in 15 minutes instead of 10, 20 and even 30 hours required by the apparatus actually in use for distilling the same materials.

According to the invention, the bituminous schists, previously broken up in grains from 10 to 15 millimeters in diameter and dried, are introduced in a cylindrical retort of great length rotating about its slightly inclined axis within a suitable heating chamber where its temperature is raised to about 750° C. The schists progress in a continuous manner through this retort and, after about a quarter of an hour's distillation, their residue falls in a water vat by generating a certain quantity of steam; the latter is sent in the retort at its lower end, at the same time as a certain quantity of superheated steam, to be mixed with the distillation gases and vapors evolved from the schists.

This gaseous mixture is sucked in a continuous manner to the upper end of the retort, that is to say that where the schists are admitted.

The passage of the steam through the retort, in reverse direction to the circulation of the schists, facilitates the evolution of the distillation products and, consequently, to increase the rapidity of the operation.

The accompanying drawing illustrates, by way of example, a form of construction of a plant devised for carrying out the process above described.

Fig. 1 is a longitudinal section of this plant.

Fig. 2 is a cross section made along line II—II of Fig. 1.

1 designates a rotary retort constituted by a long steel tube, having for instance 1 meter in diameter and 11 meters in length, and mounted according to a slightly inclined direction within a heating chamber 2 through which pass the combustion products of a fire box 3.

The ends of the retort 1 project outside this chamber 2 and are supported, so as to be capable of rotating, by hollow bearings 4, 5 or suitable boxes provided with stuffing boxes 4a, 5a. About the retort is secured a toothed ring 6 gearing with a pinion to which a transmission (not shown) imparts a continuous rotary movement.

Above the upper end of the retort is arranged a hopper 7 in which the previously broken up schist is discharged. From this hopper, the schist falls upon a caterpillar distributor 8 which continuously distributes it to a drying apparatus 9 (diagrammatically illustrated) which is heated by the combustion products of the fire box 3 before they reach the stack 10. After its passage through the drying apparatus, the schist falls in the upper end of the retort, by passing through a drum 11, the box 4 and a channel or trough 12; this supply device is so devised that the gases cannot escape from the retort towards the drying apparatus and flow only through a conduit 13 extending from the box 4 and in which a suitable exhauster, not shown, produces a partial vacuum of about 5 centimeters of water below atmospheric pressure.

To the walls of the revolving retort is secured a helical rib 14, extending from one end of the retort to the other, and causing the schist to continuously and regularly progress towards the lower end. At this latter point, the heated residue of the schist falls through the box 5 and a discharge member 15 placed in a water pan 16 where it is cooled and thereby generates steam.

Under the influence of the suction maintained at 13, this steam rises in the bell and passes through the retort 1 in reverse direction to the passage of the schist; the evolution of the distillation products is further facilitated, if need be, by an injection of superheated steam, supplied by a tube 17.

The oil vapors flowing through the conduit 13 will be condensed by ordinary means, not shown, or by any other suitable means.

With a single retort such as that which has just been described by way of example, the output can be of about 2 cubic meters of schist per hour.

It is to be understood that the numerical indications given above are not limitative and can vary without departing thereby from the scope of the invention. Likewise, the unessential arrangements of the plant illustrated can be modified.

I claim:

1. Apparatus for the distillation of pulverized bituminous schists, comprising a heating chamber, an elongated distillation retort mounted in this chamber and adapted to revolve about its axis which is slightly inclined, the ends of this retort extending outside the said chamber, bearings for the said ends of the retort, a hopper for the pulverized schist, a drying apparatus adapted to receive the schist issuing from the said hopper, a shist-containing chamber attached to the said bearing at the upper end of the inclined retort, means adapted to receive the schist issuing from the drying apparatus and to convey it into the schist chamber, a trough extending from this schist chamber into the inlet end of the retort, means adapted to rotate the retort, means in the retort for causing the schist to progress from one end of the latter to the other during its rotation, means for introducing steam into the lower end of the retort, and means for withdrawing the volatile distillation products.

2. Apparatus for the distillation of pulverized bituminous schist, comprising a heating chamber, an elongated distillation retort mounted in this chamber and adapted to revolve about its axis which is slightly inclined, the ends of this retort extending outside the said chamber, bearings for the said ends of the retort, a hopper for the pulverized schist, a drying apparatus adapted to receive the schist falling from the said hopper, a schist-containing chamber attached to the said bearing at the upper end of the incline retort, means adapted to receive the schist issuing from the drying apparatus and to convey it into the schist chamber, a trough extending from this schist chamber into the inlet end of the said retort, means adapted to rotate the retort, means in the retort for causing the schist to progress from one end of the latter to the other during its rotation, a discharge member extending downwardly from the lower end of the retort, a water pan in which dips the lower part of the said discharge member, and means for withdrawing the volatile distillation products.

RENÉ PETIT.